(12) United States Patent
Eyole et al.

(10) Patent No.: US 11,693,665 B2
(45) Date of Patent: Jul. 4, 2023

(54) CO-SCHEDULED LOADS IN A DATA PROCESSING APPARATUS

(71) Applicant: Arm Limited, Cambridge (GB)

(72) Inventors: Mbou Eyole, Cambridge (GB); Michiel Willem Van Tol, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/754,739

(22) PCT Filed: Sep. 28, 2020

(86) PCT No.: PCT/GB2020/052343
§ 371 (c)(1),
(2) Date: Apr. 11, 2022

(87) PCT Pub. No.: WO2021/074585
PCT Pub. Date: Apr. 22, 2021

(65) Prior Publication Data
US 2023/0064455 A1 Mar. 2, 2023

(30) Foreign Application Priority Data
Oct. 15, 2019 (GB) .................................... 1914923

(51) Int. Cl.
*G06F 9/30* (2018.01)
*G06F 9/38* (2018.01)

(52) U.S. Cl.
CPC ........ *G06F 9/3836* (2013.01); *G06F 9/30043* (2013.01); *G06F 9/3838* (2013.01)

(58) Field of Classification Search
CPC ... G06F 9/30043; G06F 9/3836; G06F 9/3838
See application file for complete search history.

(56) References Cited

U.S. PATENT DOCUMENTS 7,222,226 B1 * 5/2007 Lepak .................. G06F 9/3842
712/225
2002/0152420 A1 * 10/2002 Chaudhry ........... G06F 11/1641
714/11
(Continued)

FOREIGN PATENT DOCUMENTS

GB          2540405 A      1/2017

OTHER PUBLICATIONS

Davidson, Jack W., et al. "Memory Access Coalescing: A Technique for Eliminating Redundant Memory Accesses", Department of Computer Science, Thornton Hall University of Virginia, Charlottesville, VA 22903 U.S. A., 1994.
(Continued)

*Primary Examiner* — Jacob Petranek
(74) *Attorney, Agent, or Firm* — Nixon & Vanderhye P.C.

(57) ABSTRACT

A data processing apparatus and method of operating such is disclosed. Issue circuitry buffers operations prior to execution until operands are available in a set of registers. A first and a second load operation are identified in the issue circuitry, when both are dependent on a common operand, and when the common operand is available in the set of registers. Load circuitry has a first address generation unit to generate a first address for the first load operation and a second address generation unit to generate a second address for the second load operation. An address comparison unit compares the first address and the second address. The load circuitry is arranged to cause a merged lookup to be performed in local temporary storage, when the address comparison unit determines that the first and the second address differ by less than a predetermined address range characteristic of the local temporary storage.

24 Claims, 10 Drawing Sheets

(56) References Cited

U.S. PATENT DOCUMENTS

Figure 1:
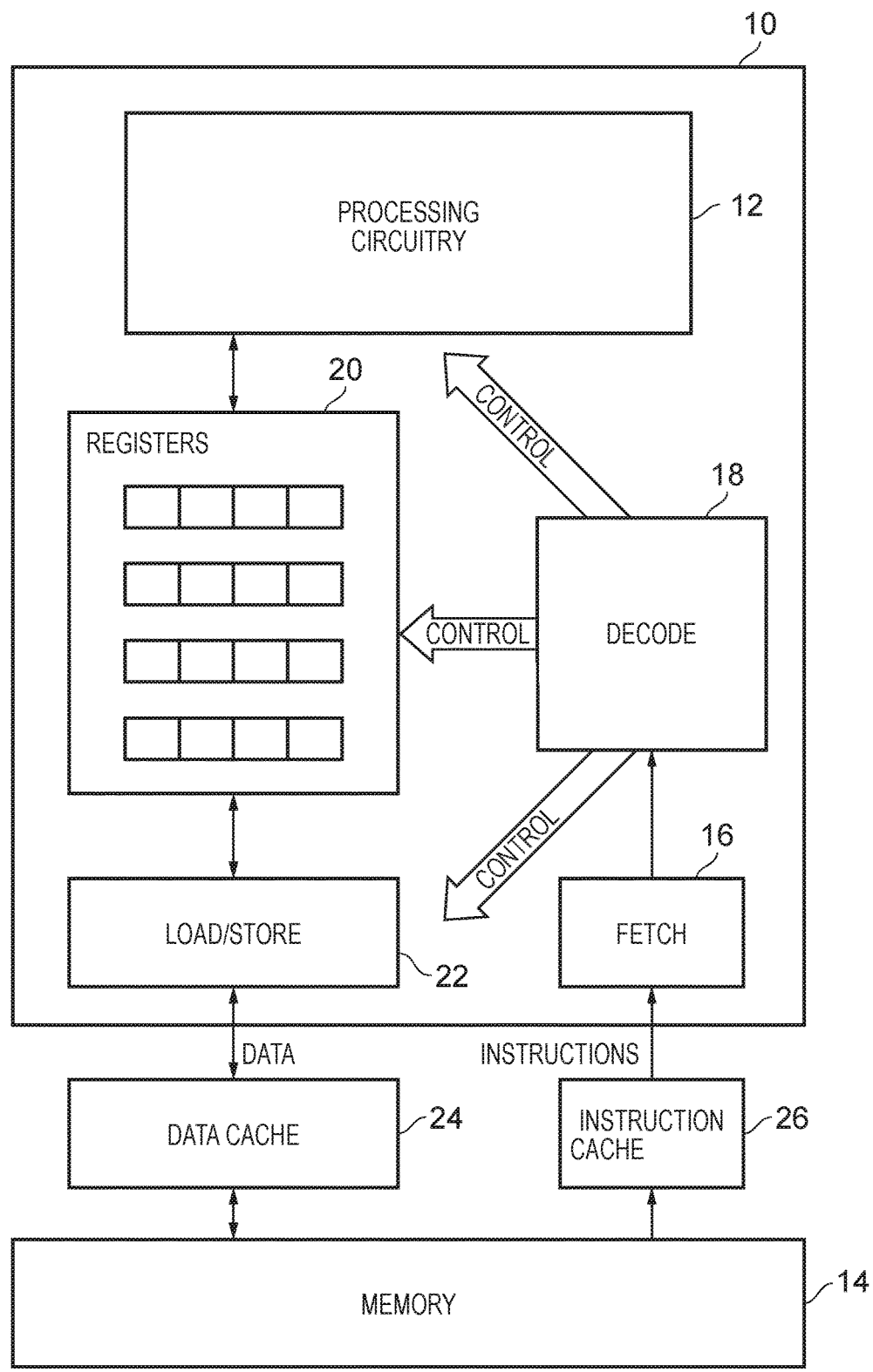

| | | | |
|---|---|---|---|
| 2004/0015904 A1* | 1/2004 | Jourdan | G06F 9/384 |
| | | | 712/E9.046 |
| 2011/0264860 A1* | 10/2011 | Hooker | G06F 12/0862 |
| | | | 711/E12.024 |
| 2017/0249144 A1* | 8/2017 | Jaget | G06F 9/3824 |
| 2019/0171452 A1 | 6/2019 | King | |

OTHER PUBLICATIONS

Kloosterman, John, et al., "WarpPool: Sharing Requests with Inter-Warp Coalescing for Throughput Processors", Computer Engineering Lab, University of Michigan, Ann Arbor, MI; 2015.

* cited by examiner

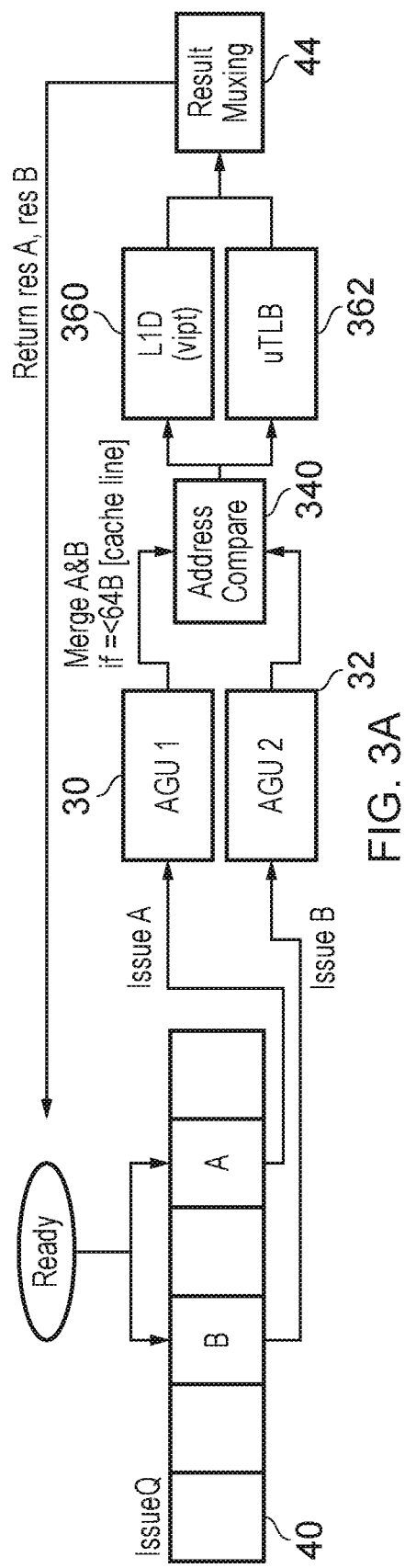
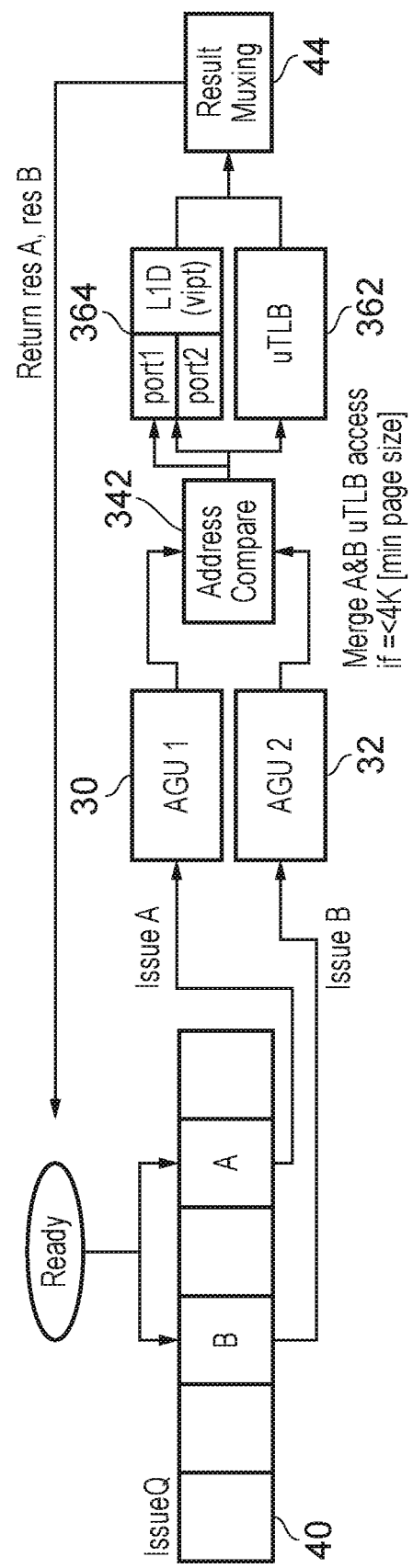

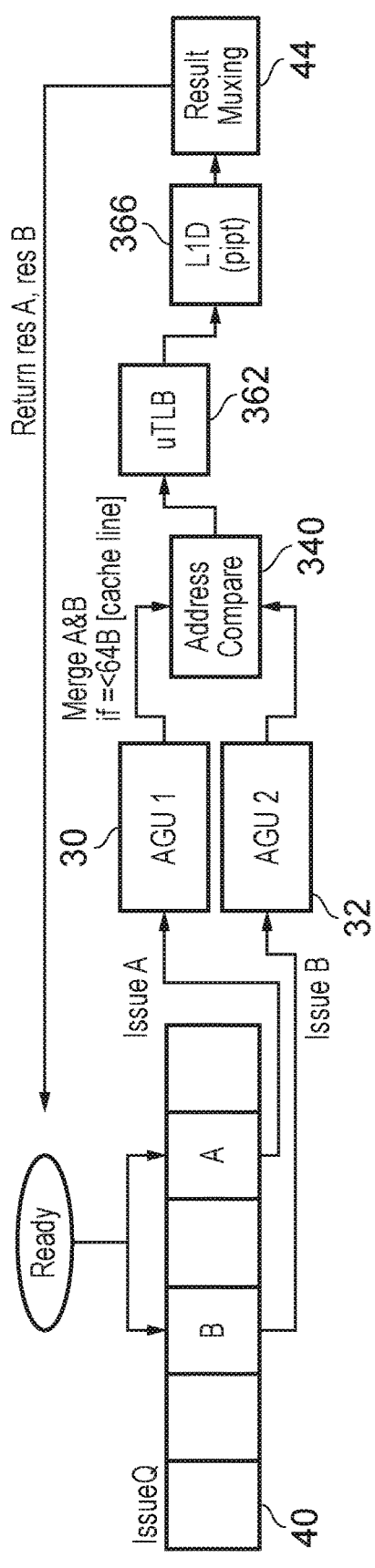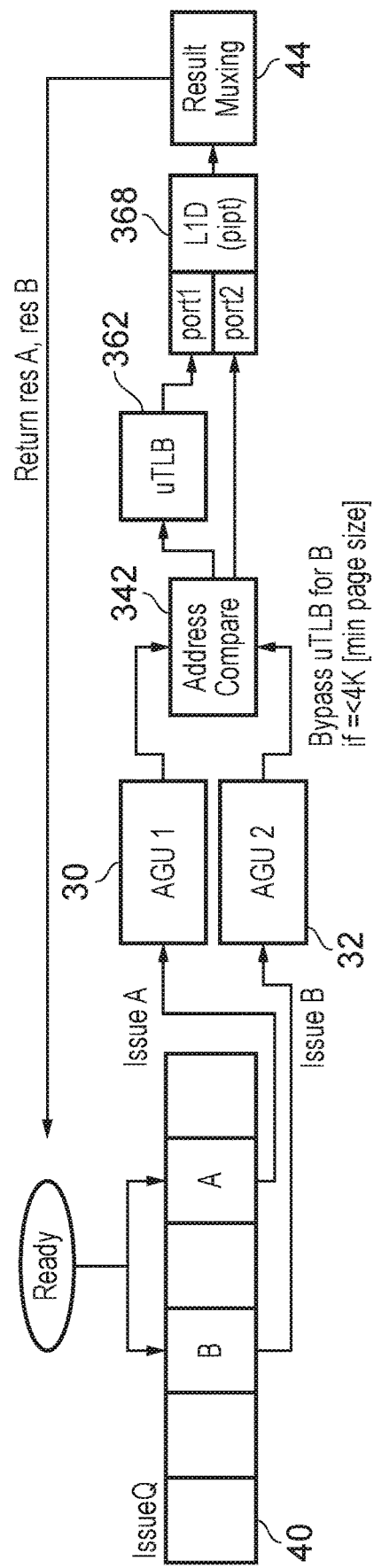

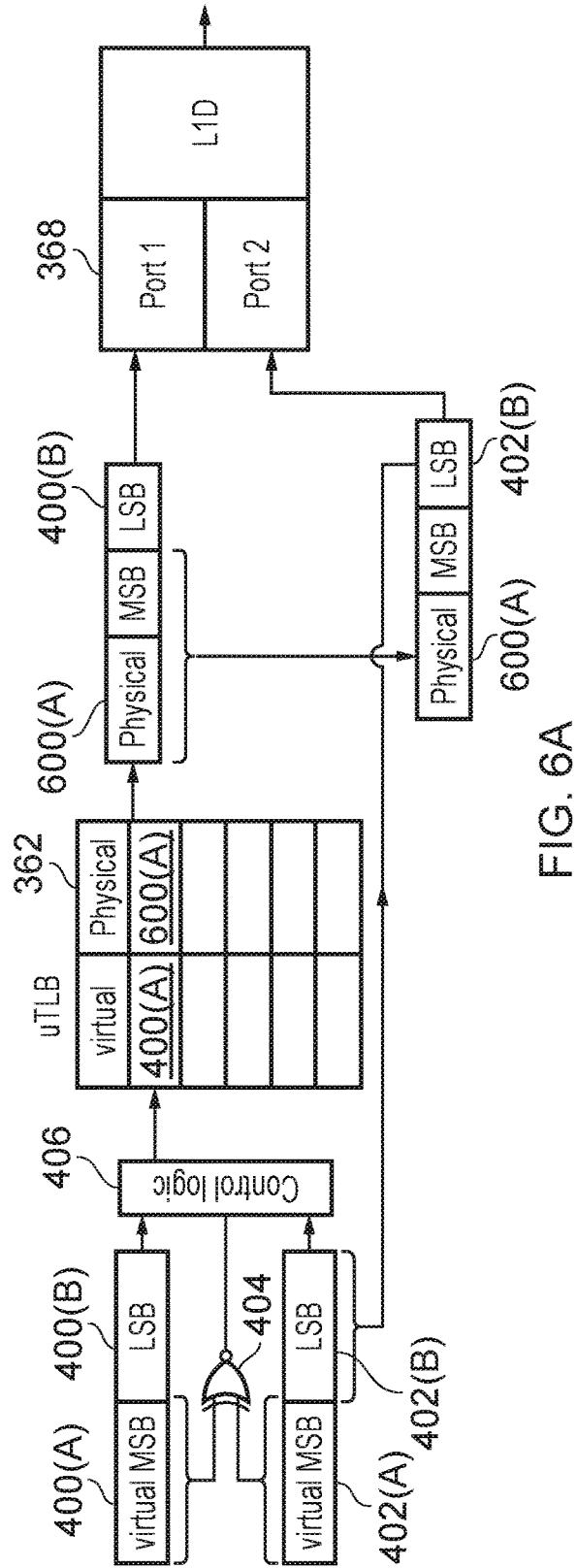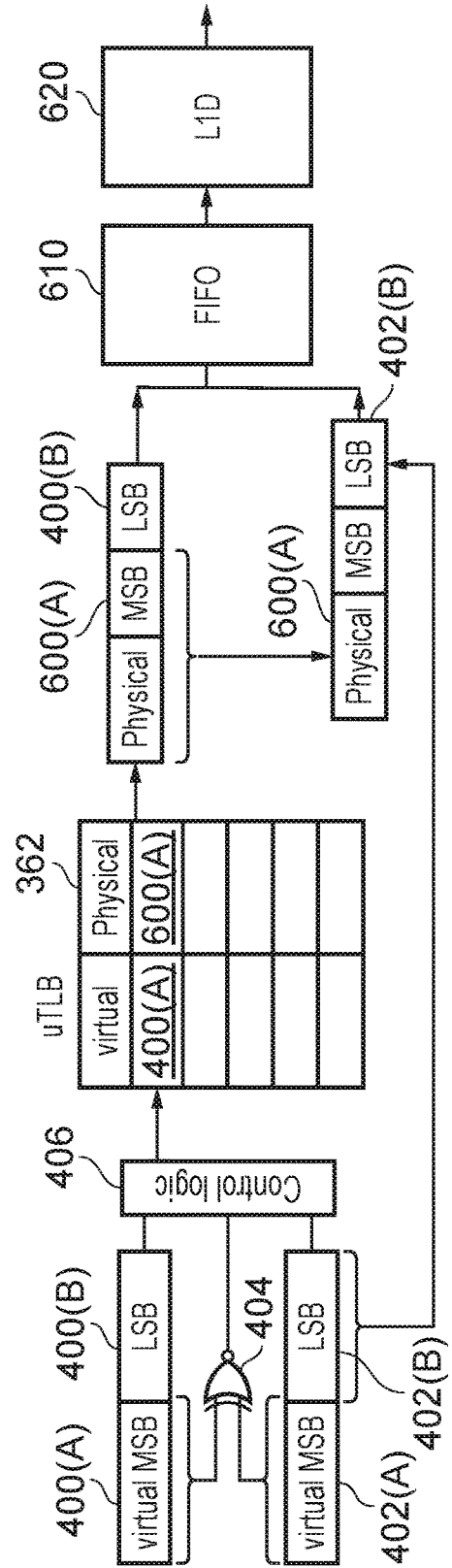
FIG. 6A
FIG. 6B

CO-SCHEDULED LOADS IN A DATA PROCESSING APPARATUS

The present techniques relate to data processing. In particular they relate to the performance of load operations in a data processing apparatus.

A data processing apparatus which is arranged to execute data processing instructions may be provided in a pipelined manner, in which instructions which are fetched from memory are first decoded and then issued for execution. An instruction can only be executed once the operands it specifies are available in local registers of the data processing apparatus to which the execution unit has access. Accordingly, an instruction may be temporarily held in an issue queue after decoding, pending the availability of its operands, before being issued for execution. One type of instruction which may be defined is a load instruction, which causes a specified data item to be retrieved from the memory system of the data processing apparatus and stored in one of the local registers. Such a load instruction may specify the data item to be retrieved from the memory system in an indirect manner, such as via a pointer to a memory location, or via a base pointer to a memory location to which an offset needs to be applied, and indeed possibly where that offset itself is not specified as an immediate value in the instruction, but also needs retrieval and/or determination.

In one example embodiment there is a data processing apparatus comprising: execution circuitry to perform data processing operations in response to a sequence of instructions; issue circuitry to buffer operations resulting from the sequence of instructions prior to execution until operands required by the operations are available in a set of registers, wherein the issue circuitry is arranged to identify a first load operation and a second load operation based on the first load operation and the second load operation being dependent on a common operand and an availability of the common operand in the set of registers; load circuitry to load at least one operand into the set of registers in response to a load instruction in the sequence of instructions, wherein the load circuitry further comprises: a first address generation unit arranged to generate a first address in response to the first load operation identified by the issue circuitry; a second address generation unit arranged to generate a second address in response to the second load operation identified by the issue circuitry; and an address comparison unit arranged to compare the first address and the second address; and local temporary storage to store copies of data values from memory, wherein the load circuitry is arranged to cause a merged lookup to be performed in the local temporary storage based on the first address and the second address when the address comparison unit determines that the first address and the second address differ by less than a predetermined address range characteristic of the local temporary storage.

In another example embodiment there is a method of performing data processing comprising the steps of: identifying in a sequence of operations held in an issue queue a first load operation and a second load operation based on the first load operation and the second load operation being dependent on a common operand and availability of the common operand in the set of registers; generating a first address in response to the first load operation; generating a second address in response to the second load operation identified in the sequence of instructions in the issue queue; in a load unit comparing the first address and the second address; and causing a merged lookup to be performed in local temporary storage of the load unit based on the first address and the second address when the first address and the second address differ by less than a predetermined address range characteristic of the local temporary storage.

In another example embodiment there is a data processing apparatus comprising: means for identifying in a sequence of operations held in an issue queue a first load operation and a second load operation based on the first load operation and the second load operation being dependent on a common operand and availability of the common operand in the set of registers; means for generating a first address in response to the first load operation; means for generating a second address in response to the second load operation; in a load unit, means for comparing the first address and the second address; and means for causing a merged lookup to be performed in local temporary storage of the load unit based on the first address and the second address when the first address and the second address differ by less than a predetermined address range characteristic of the local temporary storage.

Figure 2A:
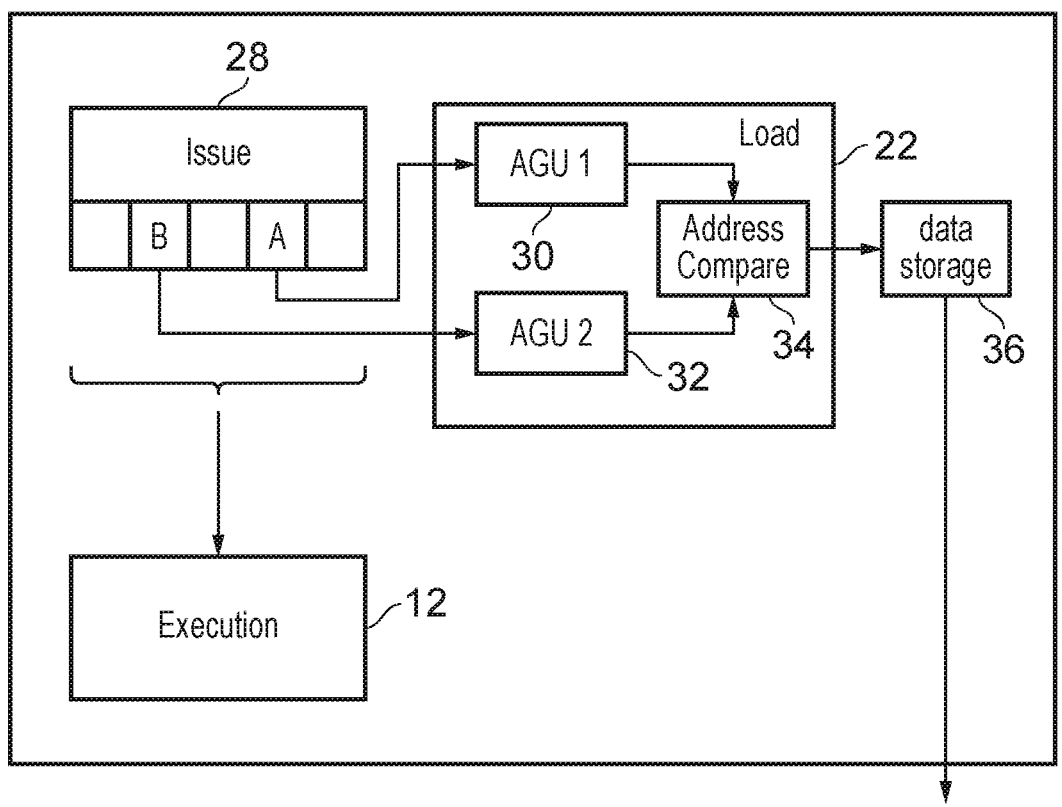
Figure 2B:
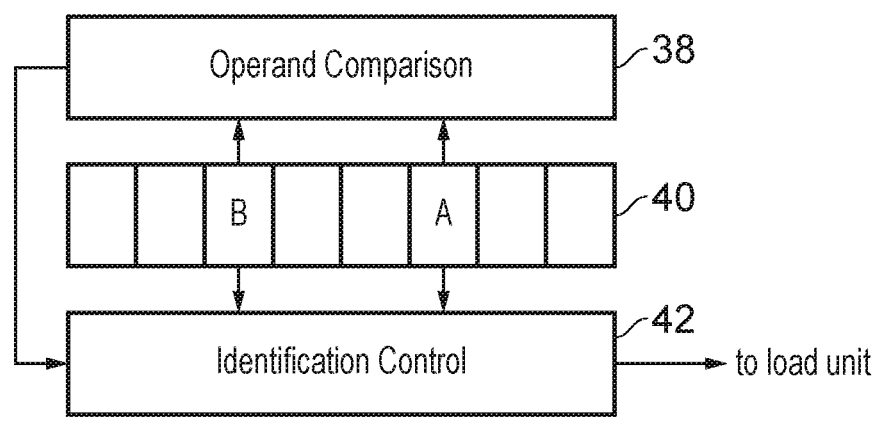
Figure 4:
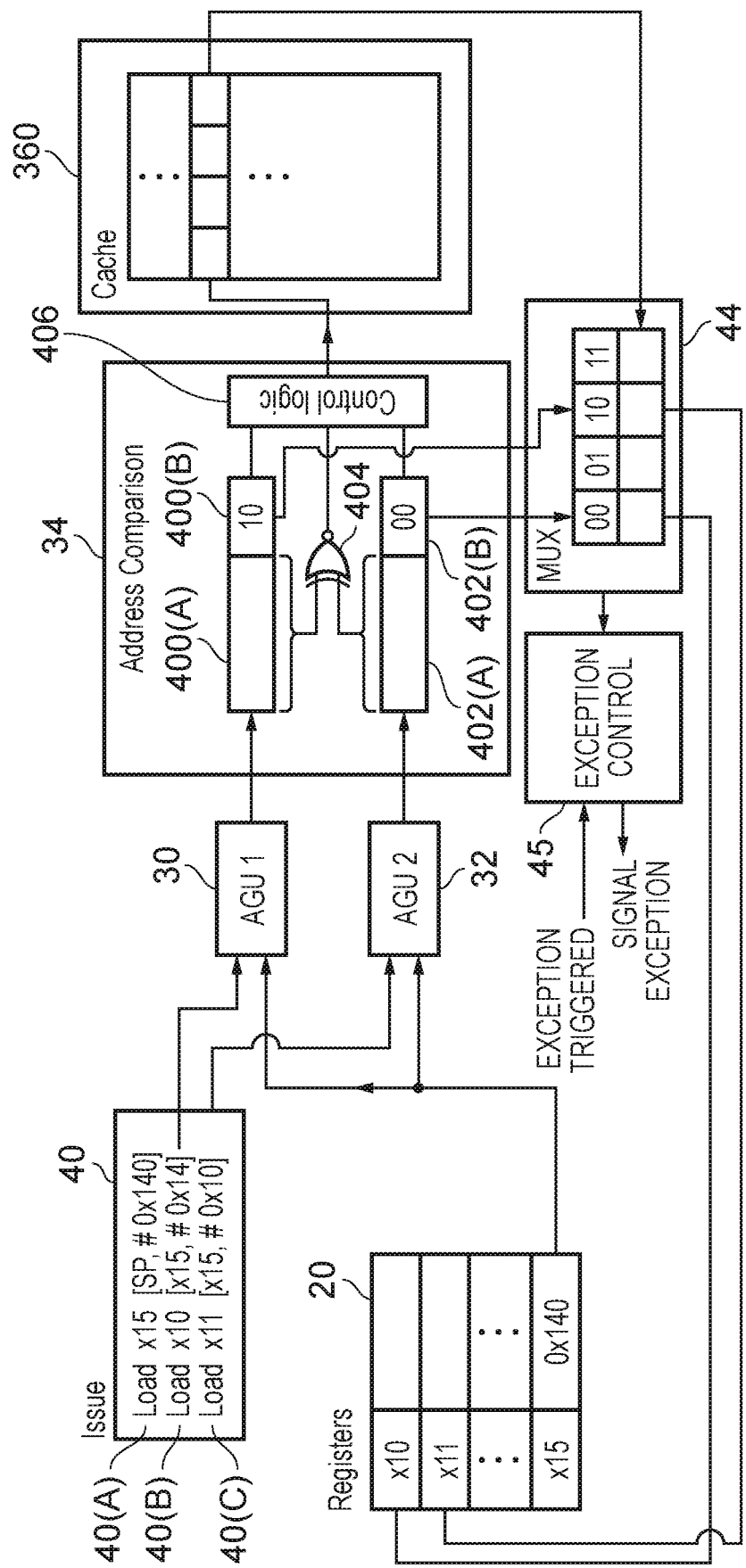
Figure 5A:
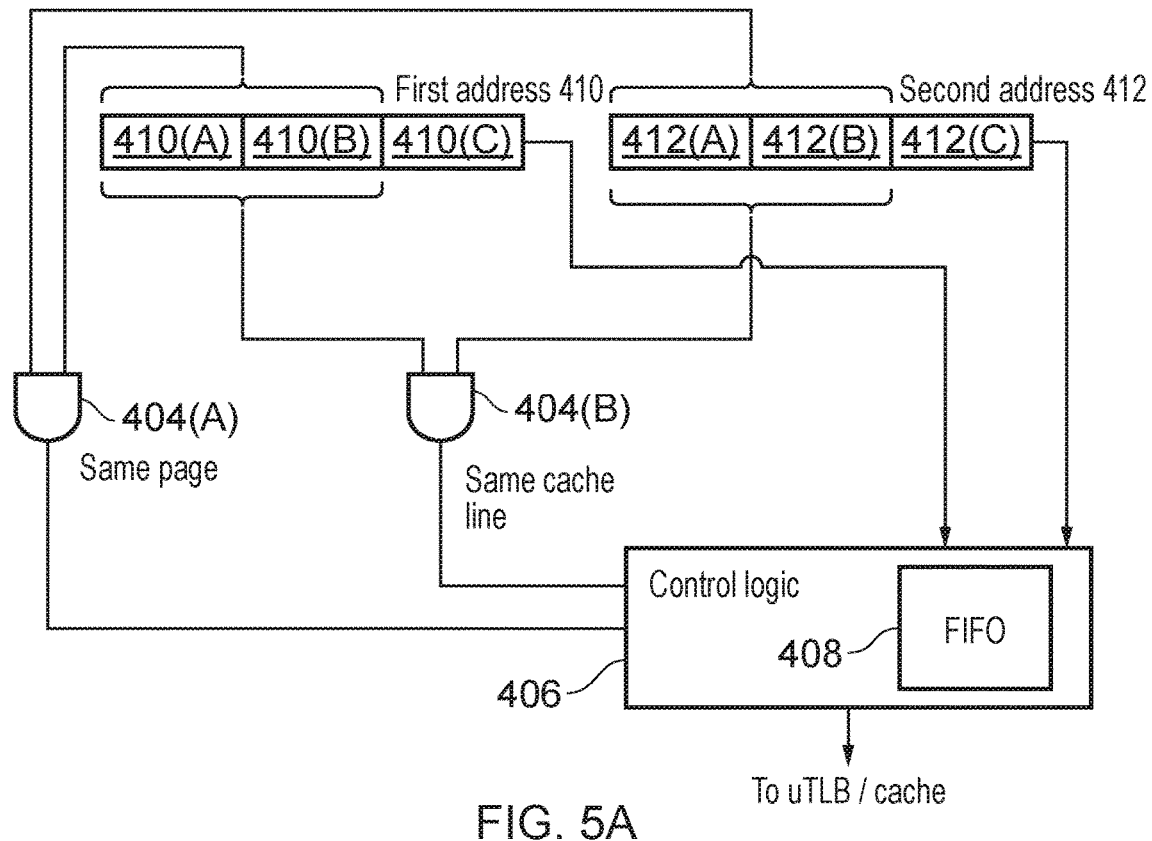
Figure 5B:
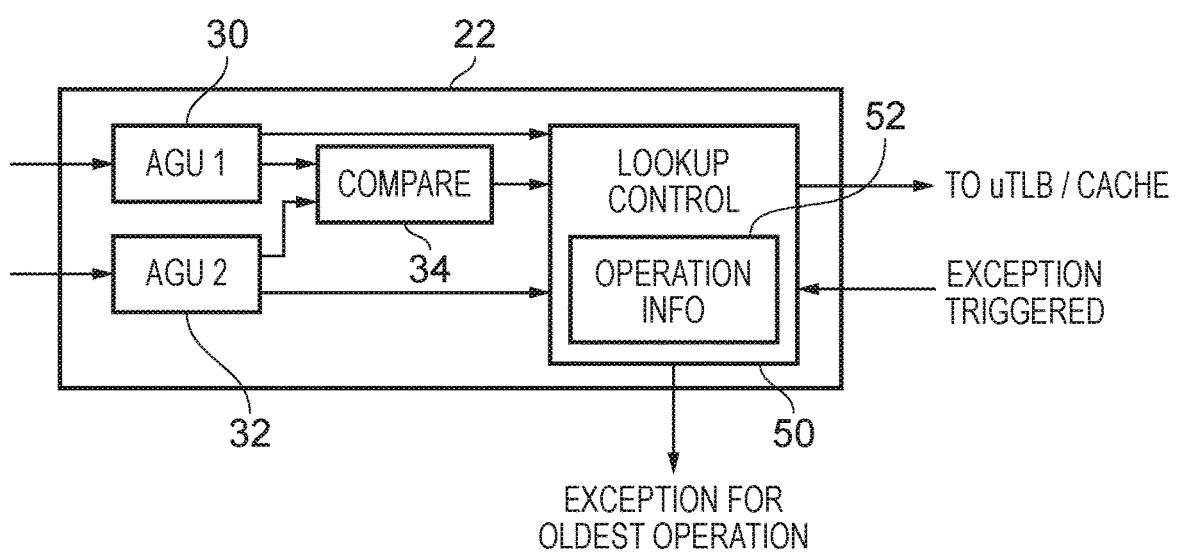
Figure 7:
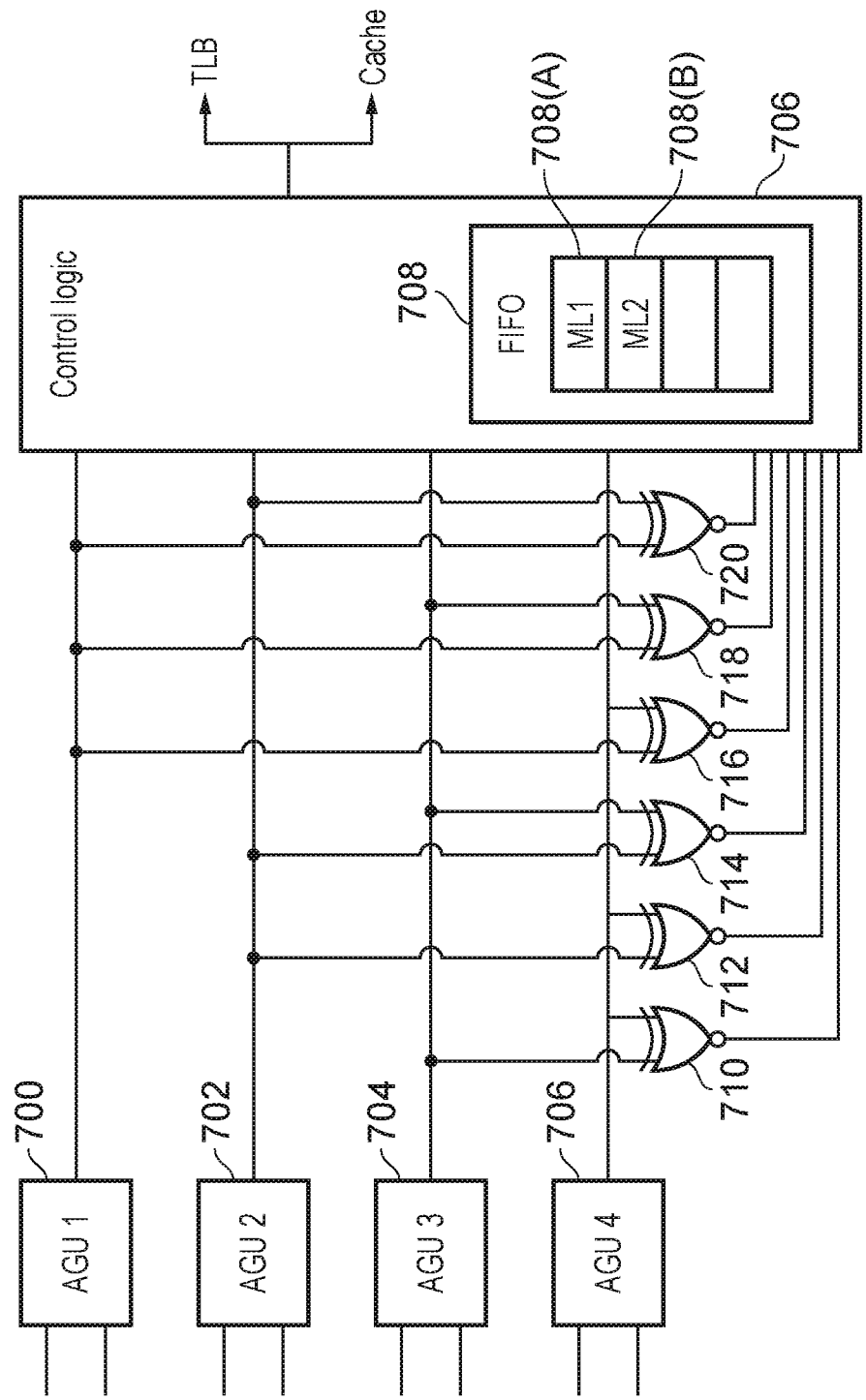
Figure 8:
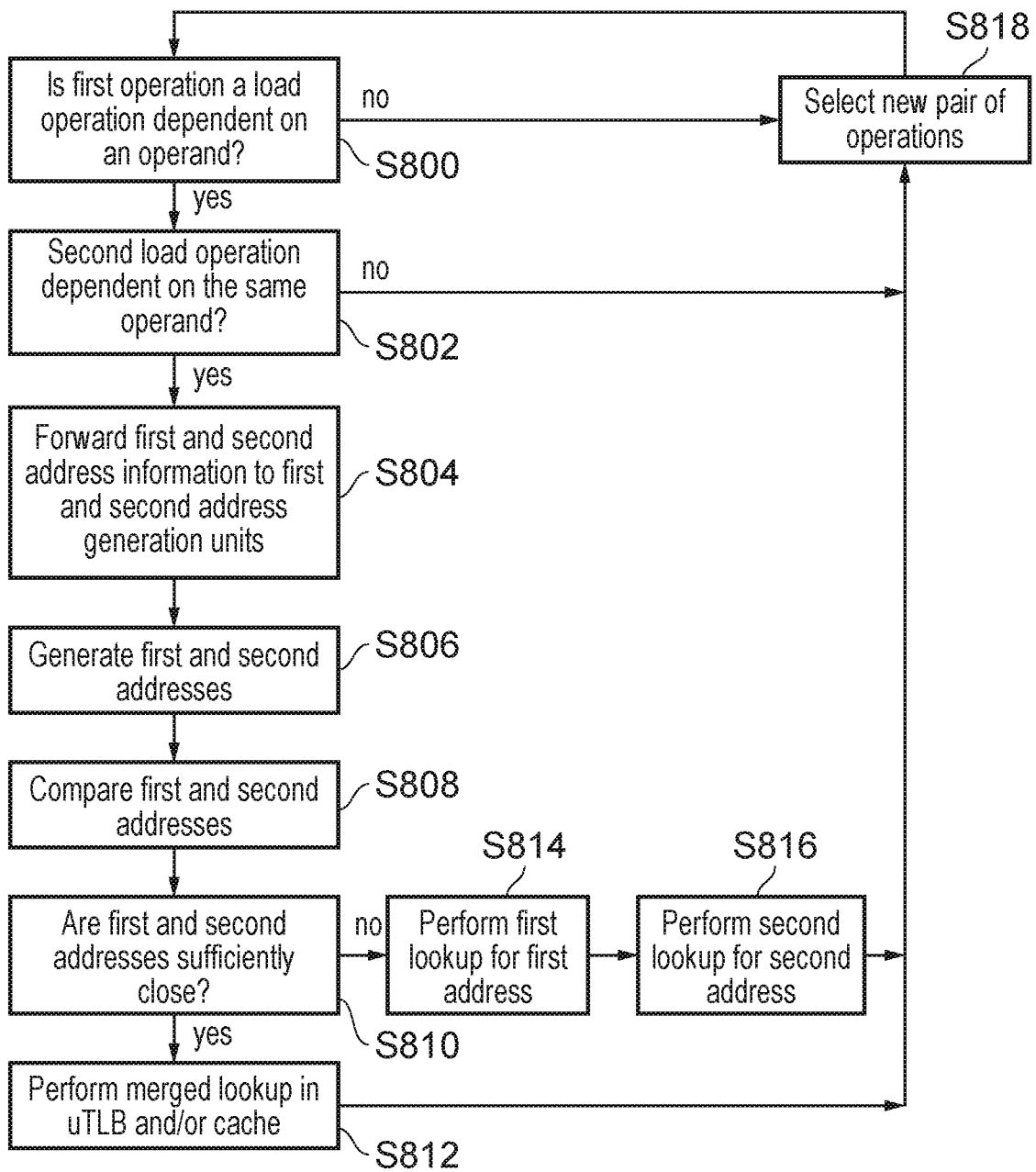
Figure 9:
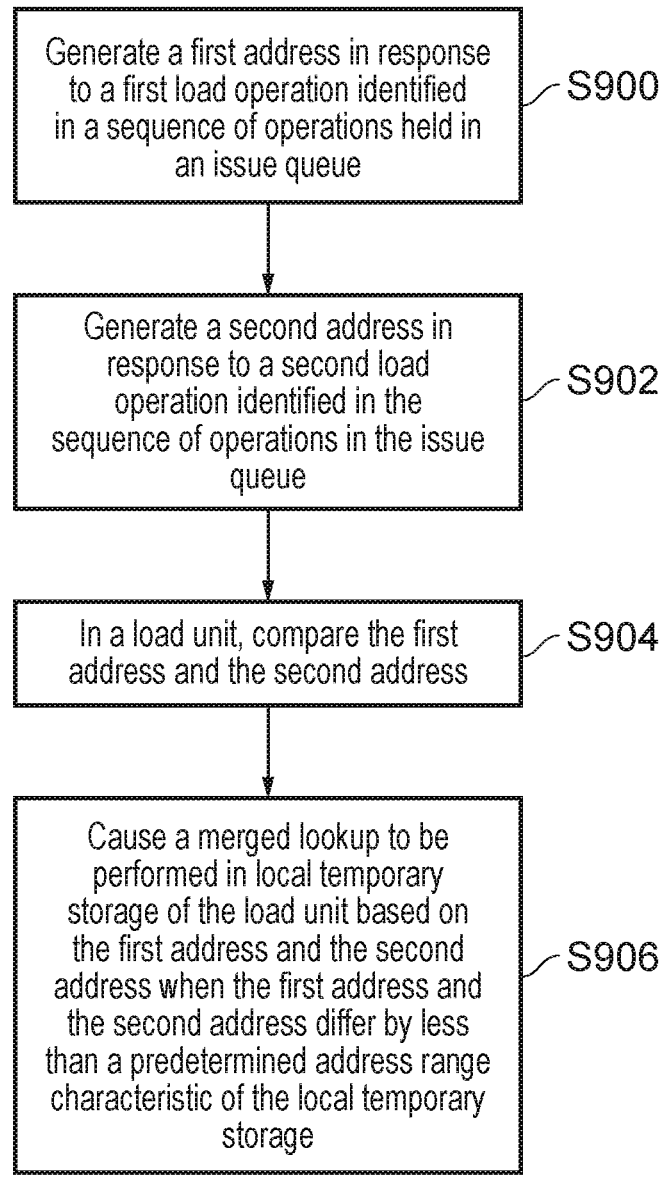

The present techniques will be described further, by way of example only, with reference to embodiments thereof as illustrated in the accompanying drawings, in which:

FIG. 1 schematically illustrates a data processing apparatus which may embody various examples of the present techniques;

FIG. 2A schematically illustrates a data processing apparatus comprising an issue queue and a load unit according to various examples of the present techniques;

FIG. 2B schematically illustrates an issue queue and associated operand comparison circuitry and identification control circuitry according to various examples of the present techniques;

FIGS. 3A-3D schematically illustrate an issue queue, two address generation units, address comparison units, an L1 data cache, and a micro-TLB in various configurations according to various examples of the present techniques;

FIG. 4 schematically illustrates the process of performing a merged lookup according to some embodiments of the present techniques;

FIG. 5A schematically illustrates further detail of the operation of the address comparison circuitry shown in FIG. 4 according to some embodiments;

FIG. 5B schematically illustrates in more detail of a load/store unit according to some embodiments;

FIGS. 6A and 6B schematically illustrates further detail of some embodiments of the present techniques;

FIG. 7 schematically illustrates the function of a load unit according to some embodiments of the present techniques;

FIG. 8 shows a sequence of sequence of steps that are carried out by some embodiments of the present techniques in order to determine whether a merged lookup is to be performed; and FIG. 9 shows a sequence of sequence of steps that are carried out in some of the embodiments of the present techniques.

At least some embodiments provide a data processing apparatus comprising: execution circuitry to perform data processing operations in response to a sequence of instructions; issue circuitry to buffer operations resulting from the sequence of instructions prior to execution until operands required by the operations are available in a set of registers, wherein the issue circuitry is arranged to identify a first load operation and a second load operation based on the first load operation and the second load operation being dependent on a common operand and an availability of the common operand in the set of registers; load circuitry to load at least one operand into the set of registers in response to a load instruction in the sequence of instructions, wherein the load circuitry further comprises: a first address generation unit arranged to generate a first address in response to the first load operation identified by the issue circuitry; a second address generation unit arranged to generate a second address in response to the second load operation identified by the issue circuitry; and an address comparison unit arranged to compare the first address and the second address; and local temporary storage to store copies of data values from memory, wherein the load circuitry is arranged to cause a merged lookup to be performed in the local temporary storage based on the first address and the second address when the address comparison unit determines that the first address and the second address differ by less than a predetermined address range characteristic of the local temporary storage.

The present techniques recognise that a common pattern in programs running on a data processing apparatus is to load multiple values indexed from the same base pointer in relative close proximity in a program. For example, the load could be accessing different members of a structure after dereferencing a pointer, or reading a stack frame after a function call. In a standard configuration, the multiple load operations are handled by one or more load units each configured to handle a single load. The present techniques recognise that an advantage can be achieved by reducing the number of independent lookups generated (for example translation lookaside buffer lookups and cache lookups), thereby improving throughput of loads whilst not requiring a full additional load unit (and thus improving the power performance per unit area). This is achieved through the detection and co-scheduling of loads to neighbouring addresses based on the speculative grouping of loads that share a dependency of a source operand into a merged lookup. This identification of loads where such a merged lookup might be performed is carried out with respect to an issue queue in the present techniques. Accordingly, where an issue queue might hold a combination of instructions, micro-ops (split instructions), and macro-ops (fused instructions), the identification may be performed with respect to any of these types of "operation", specifically with respect to "load operations", which may be temporarily held in the issue queue. The term "load operation" is used here with respect to the content of the issue queue to refer to any of: an (architectural) load instruction, a load micro-op, and a load macro-op. This approach, where the hardware of the issue circuitry detects groups of loads based on shared dependencies, thus means that no software-burden is imposed on the programmer (or compiler) to seek to identify such first and second load instructions. Further, this technique is to be distinguished from techniques relating to multi-threaded instruction execution, where attempts are made to identify loads in parallel execution streams which might benefit from some kind of cooperative handling. Here the technique is directed to sequential instruction flows in a single threaded context. It is further to be noted that the present techniques do not propose that the first and second load instructions are fused. Rather, they are co-scheduled and if their addresses overlap sufficiently, an access to local storage (such as a TLB or cache) is coalesced.

The loads to be co-scheduled or coalesced are not limited to a particular size or data type. The only requirement for the coalescence of loads is that they share a dependency on a source operand. A non-limiting example code sequence where the present techniques may be brought to bear could be:

| 1. LDR  | x15, | [sp,  | #0x140]; | Load base pointer to structure from stack variable |
|---------|------|-------|----------|----------------------------------------------------|
| 2. LDR  | x10, | [x15];|          | Load next pointer field                            |
| 3. LDRH | x11, | [x15, | #0x10];  | Load half word data field                          |
| 4. LDRB | x12, | [x15, | #0x14];  | Load byte data field                               |

Instruction #1 loads a pointer from a memory location, in this specific example from a variable that is currently spilled on the stack, and stores the value into the register x15. The result value from instruction #1 held in register x15 feeds into instructions #2 to #4, which use the value stored in x15 as a base pointer to relatively address and fetch individual fields from the reference structure in memory. The present techniques are based on the observation that instructions #2 to #4 share the same source register dependency of register x15, which means all three become ready for execution at the same time due to the same source operand becoming available. This knowledge is used to speculatively issue at least two of the three load instructions #2, #3 and #4 to a specially adapted load unit which contains at least two address generation units. If the result of the address generation stage yields that all virtual addresses differ by less than a predetermined address range, they can be coalesced into a single merged lookup within a local temporary storage unit.

The type of local temporary storage is not limited and may for example be a translation lookaside buffer for storing data used to translate between a virtual address used locally by the processing circuitry and a physical address associated with a physical location in the memory hierarchy at which the data element is stored. In other embodiments, the local temporary storage may for example be a data cache in which temporary copies of data items are stored local to the processing circuitry.

In order for a merged lookup to be performed, there are two requirements that must be met. Firstly, the issue circuitry detects that the first load operation and the second load operation must be based on a common operand. Once this condition is met, the first load operation and the second load operation are passed to the same load unit. The load unit contains multiple address generation units, one for each of the load operations that are passed to the load unit by the issue circuitry. The first address generation unit generates a first address based on the first load operation and the second address generation unit generates a second address based on the second load operation. As each of the address generation processes are carried out by a separate address generation unit, this step can be performed in parallel. However, it should be noted that a single address generation unit could also generate multiple addresses in series. Once the addresses have been generated the second requirement is that the addresses fall within a predetermined range. The predetermined range is characteristic of a local temporary storage unit. In some embodiments, where the local temporary storage unit is a data cache, the predetermined address range could correspond to the size of a cache line within the data cache. In other embodiments, where the local temporary storage is a translation lookaside buffer, the local temporary storage could be a smallest page size associated with the granularity with which address translation data is stored within the translation lookaside buffer. Once the addresses have been generated, the addresses are compared by an address comparison unit to determine whether they fall within the predetermined address range. If this second condition is met then a merged lookup can be performed in the local temporary storage. Further details on the merged lookup are provided below.

The address generation units and the address comparison unit could be implemented in a number of ways. In some embodiments plural address generation units are provided and the address comparison unit performs a bit-wise comparison of a set of most significant bits of the addresses generated. Alternatively, a single address generation unit could be provided and a first address generated could be temporarily stored by the address comparison unit. Once a second address has been generated by the address generation unit the address comparison unit can compare the second address to the first address that has been temporarily stored. If the addresses correspond to addresses within the predetermined address range then a merged lookup can be performed.

In some embodiments, when the address comparison unit determines that the first address and the second address differ by more than the predetermined address range, the load circuitry is arranged to cause a first lookup to be performed for one of the first load operation and the second load operation and to cause a second lookup to be performed for another of the first load operation and the second load operation.

The way in which the first lookup and the second lookup are performed is not limited and will depend on the nature of the local temporary storage. In some embodiments, when the local temporary storage is a data cache and the predetermined address range corresponds to the size of a cache line in the data cache, the first and second lookup may be performed sequentially in the data cache. However, and as will be discussed in further detail later, if the difference between the first and second addresses is larger than the predetermined address range associated with a data cache, then a merged lookup could nevertheless be performed in a translation lookaside buffer when the difference between the first and second addresses is smaller than the granularity or smallest page size associated with the address translations in the translation lookaside buffer.

In some embodiments the merged lookup comprises use of one of the first address and the second address. The local temporary storage stores data based on an address. In some embodiments, in which the local temporary storage is a data cache, the data is stored in cache lines and the identifier used to identify the content of a given cache line corresponds to the most significant portion of the address. In some embodiments the cache line size is 64 bytes and the address portion required to identify the content of a given cache line is the most significant portion of the address. The particular data item within the cache line is therefore specified by a least significant portion of the address. For a 64 byte cache line size, where each unique memory address specifies a specific byte, the cache line specifier is therefore given by excluding the 6 least significant bits from the address. Therefore, if the first address and the second address are within 64 bytes of each other, they will share the same cache line and equally the cache line can be specified by using either one of the first address and the second address, which are identical once the 6 least significant bits of the address line have been neglected. In some embodiments, where the local temporary storage is a translation lookaside buffer (TLB) and the predetermined address range corresponds to a smallest page size of 4 kB used by the TLB, the merged lookup is performed using one of the first address and the second address, which are identical when the least significant 12 bits of the first address or the second address have been neglected.

In some embodiments the local temporary storage is a first local temporary storage and the data processing circuitry further comprises second local temporary storage, wherein one of the first local temporary storage and the second local temporary storage is a translation lookaside buffer to store translation data to convert input virtual addresses to output physical addresses. The first local temporary storage and the second local temporary storage may be arranged such that the first local temporary storage is accessed in parallel to the second local temporary storage. In some embodiments this is achieved by performing the merged lookup in both the first local temporary storage and the second local temporary storage. This can only be achieved if the difference in the address range between the first address and the second address is less than the smaller of a characteristic address range associated with the first local temporary storage and a characteristic address range associated with the second local temporary storage. However, the present techniques are not limited to that specific configuration and, as will be discussed in detail later, when the difference between the first address and the second address is larger than the smaller of the characteristic address range associated with the first local temporary storage and the characteristic address range associated with the second local temporary storage, but the address difference is smaller than the larger of the characteristic address range associated with the first local temporary storage and the characteristic address range associated with the second local temporary storage, then a merged lookup can be performed in the local temporary storage with the larger characteristic address range and a pair of lookups can be performed in the local temporary storage with the smaller characteristic address range. As will be described in more detail later, the pair of lookups may be performed in parallel in some embodiments and sequentially in other embodiments.

In some embodiments the other of the first local temporary storage and the second local temporary storage is a data cache. As discussed previously, the data cache may be a virtually addressed data cache or a physically addressed data cache. When the data cache is a physically addressed data cache it should be understood that in order for a merged lookup or a standard lookup to be performed the virtual address provided to the load circuitry must first be translated, using a translation lookaside buffer or otherwise, to a physical address.

As discussed previously, in some embodiments the predetermined address range corresponds to a cache line size of the data cache. The merged lookup therefore corresponds to a merged lookup in the cache in which the merged lookup specifies the cache line to be looked for and read from the data cache. Once the data is read out of the data cache based on the most significant portion of the address line, the specific data items requested by the first lookup and the second lookup are extracted from the data cache based on the least significant portion of the address. To give a particular example, the address may be a 32-bit address specifying a byte-addressable region of memory. The first 26 bits of the address may be used to identify the cache line and the 6 least significant bits may then be used to specify the specific byte within the 64-byte cache line, once the line has been extracted from the data cache. By this mechanism only a single cache lookup is made to provide the data associated with both the first address and the data associated with the second address.

In some embodiments for which the predetermined address range corresponds to a cache line size of the data cache, the data cache is a virtually indexed cache, and the data processing apparatus is arranged to perform the merged lookup in the data cache in parallel with a further merged lookup in the translation lookaside buffer. The characteristic address range associated with the data cache may be a cache line size of, for example, 64B. This is typically smaller than the smallest page size associated with a translation lookaside buffer, which as mentioned above may for example be 4 kB. Therefore, in such a situation if the difference between the first address and the second address is smaller than the characteristic size associated with the data cache, then it is possible to perform the merged lookup in the data cache and a further merged lookup in the translation lookaside buffer. As the data cache is a virtually addressed cache, there is no need to translate the address from a virtual address to a physical address prior to the lookup in the data cache. Therefore, the lookup in the data cache can be performed in parallel with the lookup in the translation lookaside buffer.

In some embodiments for which the predetermined address range corresponds to a cache line size of the data cache, the data cache is a physically indexed cache and the data processing apparatus is arranged to perform the merged lookup in the data cache using a physical address resulting from a prior merged lookup in the translation lookaside buffer. The characteristic address range associated with the data cache may for example be a cache line size of 64B. This is typically smaller than a smallest page size associated with a translation lookaside buffer. Therefore, if the difference between the first address and the second address is smaller than the characteristic size associated with the data cache, then in this situation it is possible to perform a single translation lookaside buffer lookup to convert from the virtual address associated with the merged lookup to a physical address associated with the merged lookup. In particular, for a 32-bit physical address specifying a byte addressable region of memory, if the translation lookaside buffer stores address translations of a 20-bit portion of the virtual address to a physical address for pages of 4 kB in size and the data cache stores cache lines of 64B in size, the translation lookaside buffer translates the most significant 20 bits of the virtual address to the most significant 20 bits of the physical address, thereby generating a 32-bit physical address. The data cache takes the 26 most significant bits of the physical address to identify the cache line to be read out of the physically addressed cache. This approach requires only a single lookup in the translation lookaside buffer and a single lookup in the physically addressed cache. However, due to the need to translate the address from a virtual address to a physical address prior to the lookup in the data cache, these two steps are performed sequentially.

In some embodiments the predetermined address range corresponds to a smallest range of address space for which the translation lookaside buffer stores the translation data. As discussed above, typically the characteristic address range associated with the translation lookaside buffer is larger than the characteristic address range associated with the data cache. Therefore, it is likely that in this situation, it will not be possible to also perform a merged lookup in the data cache.

In some embodiments for which the predetermined address range corresponds to a smallest range of address space for which the translation lookaside buffer stores the translation data, the data cache is a virtually indexed cache, and the data processing apparatus is arranged to perform the merged lookup in the translation lookaside buffer in parallel with a pair of further lookups in the data cache. As the data cache is a virtually indexed data cache it is possible to perform at least a first of the pair of further lookups in the data cache in parallel to the merged lookup in the translation lookaside buffer.

In some embodiments for which the predetermined address range corresponds to a smallest range of address space for which the translation lookaside buffer stores the translation data, the data cache is a physically indexed cache, and the data cache is arranged to use output of the merged lookup in the translation lookaside buffer to perform a pair of further lookups in the data cache. As discussed above if, for example, the translation lookaside buffer stores address translations in pages of 4 kB in size and the data cache stores cache lines of 64B in size, the translation lookaside buffer generates the most significant 20 bits of the physical address. The load circuitry is further configured to generate a pair of physical addresses comprising a first physical address made up of the 20 most significant bits of the physical address and the 12 least significant bits of the first virtual address and a second physical address made up of the 20 most significant bits of the physical address and the 12 least significant bits of the second virtual address. A pair of virtual lookups can then be performed in the data cache corresponding to the first physical address and the second physical address.

In some embodiments for which the predetermined address range corresponds to a smallest range of address space for which the translation lookaside buffer stores the translation data, the data cache comprises a first port and a second port, and the data processing apparatus is arranged to cause the pair of further lookups to be performed in parallel via the first port and the second port. For embodiments in which the data cache is a virtually addressed cache the merged lookup in the translation lookaside buffer and the pair of lookups in the data cache can all be performed in parallel. However, for embodiments in which the data cache is a physically addressed cache the merged lookup is first performed in the translation lookaside buffer. The resulting physical address is used to generate a pair of physical addresses which can be used to perform the pair of lookups in the data cache in parallel.

In some embodiments for which the predetermined address range corresponds to a smallest range of address space for which the translation lookaside buffer stores the translation data, the data cache comprises buffer circuitry associated to buffer data lookup requests, and the data processing apparatus is arranged to cause the pair of further lookups to be performed as a first lookup followed by a second lookup, and to buffer the second lookup in the buffer circuitry whilst the first lookup is performed. The buffer circuitry can take a number of forms but in its simplest form could comprise storage that is large enough to buffer the address associated with the second lookup. The address associated with the second lookup can be forwarded to the data cache subsequent to the first lookup being performed.

In some embodiments, in response to the merged lookup resulting in a miss in at least one of the data cache and the translation lookaside buffer the load circuitry is arranged to forward the merged lookup to a next level of memory hierarchy. Data is transferred to the cache in blocks that are the size of a cache line. Therefore, if a miss is detected for the merged lookup in the data cache, then forwarding the merged lookup to the next level of the memory hierarchy would cause the required cache line associated with the merged lookup to be returned. Similarly, in the case in which a miss is detected in the translation lookaside buffer where entries correspond to a smallest page size, forwarding the merged lookup to the next level of the memory hierarchy would cause the required page translation to be returned for the merged lookup. However, in some embodiments in response to the merged lookup resulting in a miss in at least one of the data cache and the translation lookaside buffer the load circuitry is arranged to forward an address of an older of the first load operation and the second load operation to a next level of memory hierarchy.

In some embodiments the data processing apparatus is an in-order data processing apparatus, and the first load operation and the second load instruction correspond to load operations from a same issue group. By considering only load operations corresponding to load operations from the same issue group it is ensured that any dependencies in the load operations to be coalesced have already been resolved. In other embodiments the data processing apparatus is an out-of-order data processing apparatus. In these embodiments any pair of load operations may be considered as potential candidates to be merged providing that their data dependencies have been resolved and, as discussed previously, the first load operation and the second load operation are dependent on a common operand.

In some embodiments the issue circuitry is further arranged to identify a third load operation based on the common operand, and the load circuitry further comprises a third address generation unit to generate a third address in response to the third load operation identified by the issue circuitry, wherein the address comparison unit is arranged to compare a group of addresses comprising the first address, the second address and the third address, and the load circuitry is arranged to cause the merged lookup to be performed based on at least two of the group of addresses when the address comparison unit determines that the at least two of the group of addresses differ by less than the predetermined address range characteristic of the temporary storage.

By arranging the issue circuitry to identify more than two load operations the chance of finding a case in which a merged lookup can be determined is increased. As an illustrative non-limiting example, there may be a first load operation, a second load operation and a third load operation which all depend on a common operand. When the addresses have been generated for the three load operations by three address generation units, it may be determined that only the first address corresponding to the first load operation and the third address corresponding to the third load operation are within the predetermined address range and therefore only the first load operation and the third load operation can be combined into a merged lookup. Alternatively all three of the load operations may be within the predetermined address range and a single merged lookup could be performed for all three load operations. It should be understood that these embodiments are not limited to three load operations and in principle any number of load operations dependent on a common operand could be identified and passed to the address generation units. In addition, the number of load operations passed to the load circuitry does not have to correlate with the number of address generation units. For example, if a first number of load operations were identified as being dependent on a common operand and a second number of address generation units are provided, where the first number is greater than the second number, then the load operations can be passed to the address generation units in batches and the resulting addresses can be buffered within the load unit to generate a merged load based on a subset of the first number of load operations. To give just one specific example, if 6 load operations were identified as being dependent on a common operand and 3 address generation units were provided, then the 6 load operations could be passed to the 3 address generation units in two groups of 3 load operations. The addresses generated by the 3 address generation units from the first set of 3 load operations could then be buffered until the second set of 3 addresses have been generated from the second set of 3 load operations.

In some embodiments the issue circuitry is further arranged to identify a fourth load operation based on the common operand, the load circuitry further comprises a fourth address generation unit to generate a fourth address in response to the fourth load operation identified by the issue circuitry, the group of addresses further comprises the fourth address, the merged lookup is a first merged lookup, the at least two of the group of addresses is a first subset of at least two of the group of addresses, and the load circuitry is arranged to cause a second merged lookup to be performed based on a second subset of at least two of the group of addresses when the address comparison unit determines that the second subset of at least two of the group of addresses differ by less than the predetermined address range characteristic of the temporary storage.

By arranging the load circuitry to identify plural merged lookups from a group of merged addresses a flexible and efficient way of generating merged lookups is provided. It should be understood that these embodiments are not limited to four load operations and four address generation units and in fact, as discussed above, any number of load operations can be considered regardless of the number of address generation units. In addition, it should be understood that the issue circuitry is not limited to generating two merged lookups and the issue circuitry could be arranged to generate any number of merged lookups dependent on the number of lookup groupings can be determined. Therefore from a first number of generated addresses a second number of merged lookups can be generated, and assuming that each merged lookup requires at least two addresses to be combined then the maximum number of merged lookups that would be expected would be half of the first number of generated addresses. Based on the previous example, if 6 load operations were identified as being dependent on a common operand and 6 addresses were generated using the techniques described herein, then up to 3 merged lookups could be generated. For example, amongst example load addresses #1 to #6, a first merged lookup could be generated based on determining that address #1 and address #4 fall within the predetermined address range, a second merged lookup could be generated based on determining that address #2 and address #6 fall within the predetermined address range, and a third merged lookup could be generated based on determining that address #3 and address #5 fall within the predetermined address range. As an alternative a first merged lookup could be generated based on determining that address #1, address #2, address #3 and address #6 all fall within the predetermined address range and a second merged lookup could be performed based on the determination that address #4 and address #5 fall within the predetermined address range. These specific examples are given for illustrative purpose only and it should be understood that any combination of addresses generated based on any number of load operations could also be considered in the generation of merged lookups.

In some embodiments in response to a detection of an exception during a merged lookup the data processing apparatus is arranged to signal the exception on an oldest load operation associated with the merged lookup. Hence, for example when a micro-architectural exception occurs on a group of one or more merged lookups it is reported on the oldest of the loads that observed the exception. In the case where only a subset of the group of merged loads is affected by the exception (for example a fine grained memory tagging mismatch) the oldest of the affected group will observe the exception.

In some embodiments the data processing apparatus further comprises data multiplexing circuitry to: extract a first data item corresponding to the first address from a first output cache line resulting from a cache access; and extract a second data item corresponding to the second address from a second output cache line. Once the merged lookup has been performed in a data cache, multiplexing circuitry is used to extract the data items from within the cache line. For example if the merged lookup corresponded to two addresses that fell within a single cache line of the data cache the cache line from the data cache would be extracted and passed to the multiplexing circuitry. The multiplexing circuitry would then, based on the first address and the second address, extract the specified data items from within the cache line and pass them to a set of data registers as specified by the respective first load operation and the second load operation. In some embodiments in response to a detection of an exception during extraction of the first data item and the second data item the data processing apparatus is arranged to signal the exception on an oldest load operation affected by the exception.

At least some embodiments provide a method of performing data processing comprising the steps of: identifying in a sequence of operations held in an issue queue a first load operation and a second load operation based on the first load operation and the second load operation being dependent on a common operand and availability of the common operand in the set of registers; generating a first address in response to the first load operation; generating a second address in response to the second load operation identified in the sequence of operations in the issue queue; in a load unit comparing the first address and the second address; and causing a merged lookup to be performed in local temporary storage of the load unit based on the first address and the second address when the first address and the second address differ by less than a predetermined address range characteristic of the local temporary storage.

At least some embodiments provide a data processing apparatus comprising: means for identifying in a sequence of operations held in an issue queue a first load operation and a second load operation based on the first load operation and the second load operation being dependent on a common operand and availability of the common operand in the set of registers; means for generating a first address in response to the first load operation; means for generating a second address in response to the second load operation; in a load unit, means for comparing the first address and the second address; and means for causing a merged lookup to be performed in local temporary storage of the load unit based on the first address and the second address when the first address and the second address differ by less than a predetermined address range characteristic of the local temporary storage.

Some particular embodiments are now described with reference to the figures.

FIG. 1 schematically illustrates a data processing apparatus 10 which may embody various examples of the present techniques. The apparatus illustrated in FIG. 1 is provided to illustrate an example context in which the techniques disclosed herein are carried out. The apparatus comprises data processing circuitry 12 which performs data processing operations on data items in response to a sequence of instructions which it executes. These instructions are retrieved from the memory 14 via instruction cache 26 to which the data processing apparatus has access and, in a manner with which one of ordinary skill in the art will be familiar, fetch circuitry 16 is provided for this purpose. Furthermore, instructions retrieved by the fetch circuitry 16 are passed to the instruction decoder circuitry 18, which generates control signals which are arranged to control various aspects of the configuration and operation of the processing circuitry 12, as well as of a set of registers 20 and a load/store unit 22. Generally, the data processing circuitry 12 may be arranged in a pipelined fashion, yet the specifics thereof are not relevant to the present techniques. One of ordinary skill in the art will be familiar with the general configuration which FIG. 1 represents and further detail description thereof is dispensed herewith merely for the purposes of brevity. The registers 20, as can be seen in FIG. 1, each comprise storage for multiple data elements, such that the processing circuitry can apply data processing operations either to a specified data element within a specified register, or can apply data processing operations to a specified group of data elements (a "vector") within a specified register. Data values required by the data processing circuitry 12 in the execution of the instructions, and data values generated as a result of those data processing instructions, are written to and read from the memory 14 and the data cache 24 by means of the load/store unit 22, which will be described in further detail with reference to the particular embodiments disclosed herein. Note also that generally the memory 14 in FIG. 1 can be seen as an example of a computer-readable storage medium on which the instructions of the present techniques can be stored, typically as part of a predefined sequence of instructions (a "program"), which the processing circuitry then executes. The processing circuitry may however access such a program from a variety of different sources, such in RAM, in ROM, via a network interface, and so on. The present disclosure describes a novel technique by which particular load instructions are co-scheduled, and if their addresses are close enough a lookup which would otherwise be separately performed for each can be coalesced (or merged) to be carried out as a single merged lookup. Further details relating to particular embodiments of the techniques disclosed herein will be described below.

FIG. 2A schematically illustrates the circuitry associated with the generation of a merged lookup in some embodiments. The circuitry associated with the generation of a merged lookup comprises issue circuitry 28, where decoded instructions are queued until they can be issued for execution. As mentioned above, the issue queue may hold a combination of instructions, micro-ops (split instructions), and macro-ops (fused instructions). Generally these are referred to here as "operations" held in the issue queue. In particular the issue circuitry 28 is required to identify load operations that are dependent on a common operand. FIG. 2B schematically illustrates some components of the issue circuitry 28, namely circuitry to perform operand comparison 38 and identification control circuitry 42. The operand comparison circuitry 38 compares operands associated with load operations in the issue queue 40. In the example illustrated in FIG. 2B, load operations A and B are compared to determine whether they are dependent on a common operand. Such a comparison is determined, for example, based on the load operations being dependent on a common register value. In other words, operands A and B will share a common operand if they are both dependent on a common register and the value of the data stored therein is not affected by other operations that may come between operations A and B in program order. Once a pair of load operations within the issue queue 40 has been identified based on the dependence of the load operations on a common operand, the identification control circuitry 42 determines when the operand on which these operations depend becomes available, and then allows these load operations to be issued to the load unit 22.

As illustrated schematically in FIG. 2A, the load unit comprises a first address generation unit (AGU) 30, a second address generation unit (AGU) 32 and an address comparison unit 34. The address generation units 30 and 32 are each configured to generate an address based on the operands passed to the load circuitry. The specific implementation of the address generation units can be any implementation as is known to one of ordinary skill in the art. The identification control circuitry 42 within the issue circuitry 28 is configured to pass the first load operation to the first address generation unit 30 and the second load operation to the second address generation unit 32. The first address generation unit 30 generates a first address that is passed to the address comparison unit 34 and the second address generation unit 32 generates a second address which is passed to the address comparison unit 34. The address comparison unit 34 is arranged to compare the first address and the second address and to determine whether the first address and the second address are within a predetermined address range. If it is determined by the address comparison unit 34 that the first address and the second address are within the predetermined address range then a merged lookup is performed by passing one of the first address or the second address to the data storage 36 which is local temporary storage. If the addresses do not fall within the predetermined address range then the load circuitry 22 is configured to cause a first lookup to be performed based on the older of the first load operation and the second load operation and a second lookup to be performed based on the younger of the first load operation and the second load operation.

FIGS. 3A to 3D schematically illustrate various embodiments of the invention disclosed herein. In particular, illustrated in FIG. 3A are: an issue queue 40 in which operations are temporarily queued prior to being issued; a first address generation unit 30; a second address generation unit 32; an address comparison unit 340; a virtually addressed L1 data cache 360; a micro translation lookaside buffer (uTLB) 362; and result multiplexing circuitry 44. The operation of the issue queue 40 and the address generation units 30 and 32 has been described with reference to FIG. 2 and is omitted here for brevity. The address comparison unit 340 is arranged to compare the first address and the second address and to determine if the difference between the first address and the second address is less than a predetermined size. In this embodiment, the predetermined size is the size of a cache line associated with the L1 data cache 360. In the illustrated example the cache line size is 64B, however, this should be understood as an example and is non-limiting. In particular it would be apparent to the person of ordinary skill that the same techniques could be applied to a cache with 32B cache lines, 128B cache lines, or indeed any other sized cache line. If the address comparison circuitry 340 determines that the difference between the first address and the second address is less than the predetermined size then the load circuitry causes a merged lookup to be performed in the virtually addressed L1 data cache 360 and in the uTLB 362 in parallel. If a hit is found in the L1 data cache or the micro translation lookaside buffer then the corresponding data is read out to the result multiplexing circuitry 44.

FIG. 3B schematically illustrates an alternative embodiment of the invention disclosed herein. In particular, illustrated in FIG. 3B are: an issue queue 40 in which operations are temporarily queued prior to being issued; a first address generation unit 30; a second address generation unit 32; an address comparison unit 342; a virtually addressed dual-ported L1 data cache 364; a micro translation lookaside buffer (uTLB) 362; and result multiplexing circuitry 44. The operation of the issue queue 40 and the address generation units 30 and 32 has been described with reference to FIG. 2 and is omitted here for brevity. The address comparison unit 342 is arranged to compare the first address and the second address and to determine if the difference between the first address and the second address is less than a predetermined size. In this embodiment, the predetermined size is the size of the granularity with which translation data is stored in the micro translation lookaside buffer (uTLB) 362. In the illustrated example the smallest page size is 4 kB, however, this should be understood as an example and is non-limiting. In particular it would be apparent to the person of ordinary skill that the same techniques could be applied regardless of the page size. If the address comparison circuitry 342 determines that the difference between the first address and the second address is less than the predetermined size, then the load circuitry causes a merged lookup to be performed in the uTLB 362. In addition, the load circuitry is configured to perform a first lookup using a first port of the virtually addressed dual-ported L1 data cache 364 and a second lookup using a second port of the virtually addressed dual-ported L1 data cache in parallel. It should be noted that the virtually addressed dual-ported data cache could be replaced with a virtually addressed single port data cache as illustrated in FIG. 3A. However, in that case the first lookup and the second lookup in the L1 data cache would be performed sequentially, with the second lookup buffered in buffer circuitry whilst the first lookup is being performed. If a hit is found in the L1 data cache or the micro translation lookaside buffer then the corresponding data is read out to the result multiplexing circuitry 44. It should further be noted that although separately described, the examples of FIGS. 3A and 3B may refer to a single embodiment. That is to say, the address comparison circuitry (a combination of that described as 340 and 342 in these figures) can be arranged to determine the difference between the first and the second address and, when the addresses are within the L1 data cache line size (e.g. 64B) the lookup procedure of FIG. 3A is triggered (i.e. merged parallel lookups in the L1 data cache and the uTLB), and when the addresses differ by more than the L1 data cache line size but are still within the smallest page size (e.g. 4 kB) of the uTLB, then the lookup procedure of FIG. 3B is triggered (i.e. a merged lookup in the uTLB and two lookups in the L1 data cache).

FIG. 3C schematically illustrates another embodiment of the invention disclosed herein. In particular, illustrated in FIG. 3C are an issue queue 40 in which operations are temporarily queued prior to being issued; a first address generation unit 30; a second address generation unit 32; an address comparison unit 340; a physically indexed L1 data cache 366; a micro translation lookaside buffer (uTLB) 362; and result multiplexing circuitry 44. The operation of the issue queue 40, the address generation units 30 and 32 has been described with reference to FIG. 2 and is omitted here for brevity. The comparison unit 340 is arranged to compare the first address and the second address and to determine if the difference between the first address and the second address is less than a predetermined size. In this embodiment, the predetermined size is the size of a cache line associated with the physically indexed L1 data cache 366. In the illustrated example the cache line size is 64B, however, this should be understood as an example and is non-limiting.

In particular it will be apparent to the person of ordinary skill that the same techniques could be applied to a cache with 32B cache lines, 128B cache lines, or indeed any other sized cache line. If the address comparison circuitry 340 determines that the difference between the first address and the second address is less than the predetermined size, then the load circuitry causes a merged lookup to be performed in the micro translation lookaside buffer, and subsequently a merged lookup in the physically indexed data cache 366 to be performed using a physical address resulting from the prior merged lookup in the translation lookaside buffer. If a hit is found in the L1 data cache or the micro translation lookaside buffer then the corresponding data is read out to the result multiplexing circuitry 44.

FIG. 3D schematically illustrates another embodiment of the invention disclosed herein. In particular, illustrated in FIG. 3D are: an issue queue 40 in which operations are temporarily queued prior to being issued; a first address generation unit 30; a second address generation unit 32; an address comparison unit 342; a physically indexed dual-ported L1 data cache 368; a micro translation lookaside buffer (uTLB) 362; and result multiplexing circuitry 44. The operation of the issue queue 40, and the address generation units 30 and 32 has been described with reference to FIG. 2 and is omitted here for brevity. The comparison unit 342 is arranged to compare the first address and the second address and to determine if the difference between the first address and the second address is less than a predetermined size. In this embodiment, the predetermined size is the size of the granularity with which translation data is stored in the micro translation lookaside buffer (uTLB) 362. In the illustrated example the smallest page size is 4 kB, however, this should be understood as an example and is non-limiting. In particular it would be apparent to the person of ordinary skill that the same techniques could be applied regardless of the page size. If the address comparison circuitry 342 determines that the difference between the first address and the second address is less than the predetermined size then the load circuitry is arranged to cause a merged lookup to be performed in the uTLB 362 and a pair of further lookups to be performed in parallel in the physically indexed dual-ported L1 data cache 368. Specifically, the first lookup is performed using the first port of the physically indexed dual-ported L1 data cache 368 using the translation output from the uTLB 362 and the first address generated by the first address generation unit. The second lookup is performed using the second port of the physically indexed dual-ported L1 data cache using the translation output from the uTLB 362 and the second address generated by the second address generation unit. It should be noted that the illustrated physically indexed dual-ported data cache could be replaced with a physically indexed single port data cache as in the illustration of FIG. 3C. However, in this case the first lookup and the second lookup in the L1 data cache would be performed sequentially, with the second lookup buffered in buffer circuitry whilst the first lookup is being performed. If a hit is found in the L1 data cache or the micro translation lookaside buffer then the corresponding data is read out to the result multiplexing circuitry 44. Here too it should further be noted that although separately described, the examples of FIGS. 3C and 3D may refer to a single embodiment. That is to say, the address comparison circuitry (a combination of that described as 340 and 342 in these figures) can be arranged to determine the difference between the first and the second address and, when the addresses are within the L1 data cache line size (e.g. 64B) the lookup procedure of FIG. 3C is triggered (i.e. a merged lookup in the uTLB, followed by a merged lookup in the L1 data cache), and when the addresses differ by more than the L1 data cache line size but are still within the smallest page size (e.g. 4 kB) of the uTLB, then the lookup procedure of FIG. 3D is triggered (i.e. a merged lookup in the uTLB and two lookups in the L1 data cache).

FIG. 4 schematically illustrates the process of performing a merged lookup according to some embodiments of the invention. The process starts at the issue queue 40, where it is identified that operations 40(B) and 40(C) are dependent on the result of operation 40(A). As described with reference to FIG. 2, the issue circuitry 28 determines that operations 40(B) and 40(C) are dependent on a common operand, in this case the contents of register x15, which is populated in response to the operation 40(A). When the register x15 in the set of registers 20 has been populated with the required operand, the issue circuitry 28 passes the first load operation 40(B) and the second load operation 40(C) to the first address generation unit 30 and the second address generation unit 32 respectively.

The address generation units 30 and 32 take the data value from register x15 in the set of registers 20 and the additional operands specified in the first load operation 40(B) and the second load operation 40(C). The address generation units 30 and 32 then generate a first address for the first load operation 40(B) and a second address for the second load operation 40(C). The first address and the second address are then forwarded to the address comparison unit 34.

The address comparison unit 34 compares the most significant portion 400(A) of the first address and the most significant portion 402(A) of the second address. In order for the difference between the two addresses be within a pre-defined range, it is required that the most significant portion of the addresses are identical. Therefore, the comparison is achieved by comparing these portions of the two addresses using comparator 404, which here is provided as a logical XNOR. The output of the comparator 404 and the two addresses 400 and 402 are passed to the control logic 406 which, if the comparator 404 indicates a match (i.e. it is determined that a merged lookup is to be performed), extracts the most significant portion of the first address 400(A) or the second address 402(A) and passes this information to the cache 360 to perform the merged lookup. If however, the control logic 406 determines that the difference between the two addresses is greater than the predetermined amount, i.e., the most significant part of the first address 400(A) is not equal to the most significant part of the second address 402(A), then a first lookup is performed using one of the first address 400 and the second address 402, whilst a second lookup based on the other of the first address 400 and the second address 402 is buffered to be performed once the first lookup has completed.

The address comparison circuitry 34 also passes the least significant portion of the first address 400(B) and the least significant portion of the second address 402(B) to the multiplexing circuitry 44, such that when a merged lookup is performed the required data items can be extracted and returned. Once the merged lookup has been performed in the data cache 360, and the required data returned, the data is passed to the multiplexing circuitry 44. The multiplexing circuitry uses the least significant portion of the first address 400(B) and the least significant portion of the second address to extract the data items specified in the merged lookup. Finally, the multiplexing circuitry passes the output data to the registers in the set of registers 20 that are specified in the first load operation 40(B) and the second load operation 40(C). Note that when the control logic 406 determines that individual first and second lookups have to be performed, then the individual results of these first and second lookups are returned according to the usual cache lookup and data return mechanisms (not explicitly shown in FIG. 4A).

FIG. 4 also shows exception circuitry 45, which may be associated with the multiplexing circuitry 44 and is configured such that, if an exception is triggered during the extraction of the data items required by the first and the second load operation, the exception is signalled as being associated with the older of the two operations.

FIG. 5A schematically illustrates further detail of the operation of the address comparison circuitry 34 according to some embodiments. The comparison circuitry 34 determines whether the first address 410 and the second address 412 correspond to addresses that differ by less than two distinct predetermined amounts. Comparator 404(A) compares the most significant portion of the first address 410(A) and the most significant portion of the second address 412(A). If the two portions 410(A) and 412(A) are identical then the two addresses are determined to be within a first predetermined range. Comparator 404(B) compares the first and second most significant portions of the first address 410(A) and 410(B) with the first and second most significant portions of the second address 412(A) and 412(B). If the compared portions are identical then it is determined that the two addresses are within a second predetermined range. The method by which the addresses are compared is non-limiting and it would be apparent to the person of ordinary skill that alternative comparison methods could achieve the same outcome. For example, the second comparator 404(B) could compare only the second most significant portion of the first address 410(B) with the second most significant portion of the second address 412(B). The determination that the addresses are within the second address range could then be determined, for example, by performing the logical AND of the output of the two comparators 404(A) and 404(B).

As a specific example, each of the addresses 410 and 412 is assumed to be a 32-bit address and the first predetermined range is the size of a page table, which for illustrative purposes is assumed to be 4 kB, and the second predetermined range is the size of a cache line, which for illustrative purposes is assumed to be 64B. It should be understood that the stated sizes are for example purpose only and any address size, page table size, and cache line size could be used in the techniques described herein. In order to determine whether the first address 410 is within the same page as the second address 412 the first 20 bits of the addresses are compared by the first comparator 404(A). It should be noted that if the comparison unit is working on virtual addresses then the number of bits in the most significant portion of the address space may be reduced accordingly. In order to determine whether the first address 410 is within the same cache line as the second address 412 then the 26 most significant bits are compared by comparator 404(B) or a combination of comparators 404(A) and 404(B).

The output of the comparators along with the least significant portion 410(C) of the first address and the least significant portion 412(C) of the second address are passed to the control logic 406, which comprises a First-In-First-Out (FIFO) buffer 408. If it is determined that a merged lookup is to be performed in the data cache, then a merged lookup is generated and passed to the data cache in parallel to or subsequent to a lookup in the micro translation lookaside buffer. If it is determined that a merged lookup is not going to be performed in the data cache (360) and/or that a merged lookup is not going to be performed in the micro translation lookaside buffer 362, then a first lookup is performed using one of the first address 410 and the second address 412 and a second lookup using the other of the first address 410 and the second address 412 is buffered in the FIFO 408.

FIG. 5B shows a further feature which may be provided in a load unit 22, where lookup control circuitry 50 is provided to control the lookups generated (i.e. separate lookups when the first and second addresses generated by the address generation units 30 and 32 differ too greatly and a merged lookup which they are close enough). This lookup control circuitry 50 maintains information 52 about the operations for which lookups have been generated (whether merged or not) and when an exception is triggered during a merged lookup, the lookup control circuitry 50 signals the exception as associated with the oldest of the operations being served by the merged lookup.

FIGS. 6A and 6B schematically illustrates further detail of some embodiments of the present invention. In particular, FIG. 6A illustrates the case in which the data cache is a twin-ported physically indexed cache 368. The first address 400 comprises a most significant portion 400(A) and a least significant portion 400(B). The second address 402 comprises a most significant portion 402(A) and a least significant portion 402(B). The comparator 404 determines whether the first address and the second address correspond to addresses within a predetermined address range. In this case the predetermined address range corresponds to the size of a page table in the uTLB 362. The function of the comparator can take any form, for example as described herein. Similarly, the size of the page table is not limited and can correspond to the size of any implemented page table. The output of the comparator 404 and the addresses 400 and 402 are input into the control logic 406 which determines if a merged lookup is to be performed. When the difference between the first address and the second address is found to be within the size of a page table in the uTLB 362, the virtual most significant portion of one of the addresses (here, the most significant portion 400(A) of the first address), is forwarded to the uTLB 362 for a single (merged) lookup to be performed. The corresponding physical most significant portion 600(A) generated thus applies to both the first address and the second address. Thus the uTLB-translated first address comprises the most significant portion 600(A) and the least significant portion 400(B) and the translated second address comprises the same most significant portion 600(A) and the least significant portion 402(B). Where in the example of FIG. 6A the L1 data cache 368 is twin-ported, the two physical addresses thus generated can be received in parallel by the data cache 368 and parallel lookups performed.

FIG. 6B illustrates a variant on the embodiment of FIG. 6A, where in this case the data cache is a single-ported physically indexed cache 620. The construction and operation of the initial components, and the structure of the first and second input addresses, in the example of FIG. 6B is the same as that discussed above in reference to FIG. 6A. Thus the first address (400(A) and 400(B)), the second address (402(A) and 402(B)), the comparator 404, the control logic 406, and the uTLB 362 are not repeated here. Hence, as in FIG. 6, the virtual most significant portion of one of the addresses (here, the most significant portion 400(A) of the first address), is forwarded to the uTLB 362 for a single (merged) lookup to be performed. The corresponding physical most significant portion 600(A) generated thus applies to both the first address and the second address. Thus the uTLB-translated first address comprises the most significant portion 600(A) and the least significant portion 400(B) and the translated second address comprises the same most significant portion 600(A) and the least significant portion 402(B). In the example of FIG. 6B the L1 data cache 368 is single-ported, so the two physical addresses generated must be handled sequentially. For this purpose, the FIFO buffer 610 is provided, such that whilst a first of the two physical addresses generated is the subject of a first lookup in the data cache 620, the second of the two physical addresses generated buffered, to then subsequently be the subject of a second lookup in the data cache 620.

FIG. 7 schematically illustrates some functions of a load unit according to some embodiments. The load unit comprises plural address generation units 700, 702, 704, and 706 to generate addresses for a first load operation, a second load operation, a third load operation, and a fourth load operation. The generated addresses are compared by a series of comparators 710, 712, 714, 716, 718, and 720, which are illustrated schematically as logical XNOR gates. However, it should be apparent to one of ordinary skill in the art that any method by which the addresses could be compared can be used to generate a set of outputs that determines which addresses are within a predetermined range. For example, the comparator circuitry illustrated in FIG. 4 and/or FIG. 5A could be used.

Comparator 710 determines whether the third address and the fourth address are within a predetermined range. Comparator 712 determines whether the second address and the fourth address are within a predetermined range. Comparator 714 determines whether the second address and the third address are within a predetermined range. Comparator 716 determines whether the first address and the fourth address are within a predetermined range. Comparator 718 determines whether the first address and the third address are within a predetermined range. Finally comparator 720 determines whether the first address and the second address are within a predetermined range. The output from the set of comparators is fed into the control logic 706 along with the addresses generated by the first address generation unit 700, the second address generation unit 702, the third address generation unit 704, and the fourth address generation unit 706. The control logic 706 determines which, if any, of the addresses can be merged into a merged lookup and can generate and store merged lookups as required in FIFO 708. For example, if the first address and second address are within the predetermined address range then a first merged lookup (ML1) 708(A) could be generated. If the third address and the fourth address are within the predetermined address range then a second merged lookup (ML2) 408(B) could be generated. The merged lookups may be dispatched to the micro translation lookaside buffer and/or the L1 data cache, or they may be stored in the FIFO whilst a further merged lookup is occurring.

It should be understood that the logic described with relation to FIG. 7 is not limited to four address generation units and any number of address generation units could be supplied. The number of addresses incorporated into a merged lookup could likewise be any number greater than one. For example, if 8 address generation units were provided then up to 4 merged lookups could be generated by the control logic 706. Similarly, if only a single merged lookup was generated based on the addresses generated by the address generation units, then the FIFO buffer can also be used to store the corresponding lookups that do not form part of the merged lookup. As a specific example based on FIG. 7, if the first address and the fourth address were determined to be within a predetermined address range, a first merged lookup would be generated. However, if the second address and the third address were not found to be within a predetermined address range of any of the other addresses then a corresponding first lookup would be generated and stored in the FIFO 708 corresponding to the second address and a second lookup would be generated and stored in the FIFO 708 corresponding to the third address. Therefore, in this example a first merged lookup is generated corresponding to the first address and the fourth address and two non-merged lookups are also generated corresponding to the second address and the third address.

FIG. 8 shows a sequence of sequence of steps that are carried out by some embodiments of the invention in order to determine whether a merged lookup is to be performed. The flow starts at step S800 in which it is determined if a first operation is a load operation dependent on an operand. If yes, then the flow proceeds to step S802, if no then the flow proceeds to step S818, where a new pair of operations are selected before flow returns to step S800. At step S802 it is determined if a second operation is a load operation that is dependent on the same operand as the first load operation. If yes, then the flow proceeds to step S804, if no then the flow proceeds to step S818, where a new pair of operations are selected before flow returns to step S800.

At step S804 the first load operation and the second load operation are forwarded to the first address generation unit and the second address generation unit. At step S806 the first address generation unit generates the first address based on the first load operation and the second address generation unit generates the second address based on the second load operation. At step S808 the comparison unit compares the first address and the second address. At step S810 it is determined if the first address and the second address are sufficiently close. In other words, it is determined if the first address and the second address correspond to addresses that are within a predetermined address range. If no, then the flow proceeds to step S814. If yes, then the flow proceeds to step S812 where a merged lookup is performed in the micro translation lookaside buffer and/or the cache. It will be understood based on the description above of the preceding figures that whether a merged lookup is performed both the micro-TLB and/or the cache depends on the difference between the first and second addresses and the relative sizes of the cache lines in the cache and the smallest page size used in the micro-TLB. Finally the flow returns to step S818, where a new pair of operations are selected before flow returns to step S800. Returning to a consideration of step S814, this step is reached when it is determined at step S810 that the first address and the second address are not within a predetermined range of address space. At step S814 a first lookup is performed based on one of the first address and the second address. At step S816 a second lookup is performed based on the other of the first address and the second address. The flow then proceeds to step S818 where a new pair of operations are selected, before returning to step S800.

FIG. 9 shows a sequence of sequence of steps that are carried out in accordance with some embodiments. In step S900 a first address is generated in response to a first load operation identified in a sequence of operations held in an issue queue. In step S902 a second address is generated in response to a second load operation identified in the sequence of operations in the issue queue. In step S904 the first address and the second address are compared in a load unit. In step S906 a merged lookup is caused to be performed in local temporary storage based on the first address and the second address, when the first address and the second address differ by less than a predetermined address range characteristic of the local temporary storage.

In brief overall summary, data processing apparatuses and methods of operating such data processing apparatuses are disclosed. Issue circuitry buffers operations prior to execution until operands required by the operations are available in a set of registers. A first load operation and a second load operation are identified in the issue circuitry, when both are dependent on a common operand, and when the common operand is available in the set of registers. Load circuitry has a first address generation unit to generate a first address for the first load operation and a second address generation unit to generate a second address for the second load operation. An address comparison unit compares the first address and the second address. The load circuitry is arranged to cause a merged lookup to be performed in local temporary storage which stores copies of data values from memory, when the address comparison unit determines that the first address and the second address differ by less than a predetermined address range characteristic of the local temporary storage.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A data processing apparatus comprising:
   execution circuitry to perform data processing operations m response to a sequence of instructions;
   issue circuitry to buffer operations resulting from the sequence of instructions prior to execution until operands required by the operations are available in a set of registers, wherein the issue circuitry is arranged to identify a first load operation and a second load operation based on the first load operation and the second load operation being dependent on a common operand and an availability of the common operand in the set of registers;
   load circuitry to load at least one operand into the set of registers in response to a load instruction in the sequence of instructions, wherein the load circuitry further comprises:
      a first address generation unit arranged to generate a first address in response to the first load operation identified by the issue circuitry;
      a second address generation unit arranged to generate a second address in response to the second load operation identified by the issue circuitry; and
      an address comparison unit arranged to compare the first address and the second address; and
   local temporary storage to store copies of data values from memory, wherein the load circuitry is arranged to cause a merged lookup to be performed in the local temporary storage based on the first address and the second address when the address comparison unit determines that the first address and the second address differ by less than a predetermined address range characteristic of the local temporary storage.

2. The data processing apparatus of claim 1, wherein when the address comparison unit determines that the first address and the second address differ by more than the predetermined address range, the load circuitry is arranged to cause a first lookup to be performed for one of the first load operation and the second load operation and to cause a second lookup to be performed for another of the first load operation and the second load operation.

3. The data processing apparatus of claim 1, wherein the merged lookup comprises use of one of the first address and the second address.

4. The data processing apparatus of claim 1, wherein the local temporary storage is a first local temporary storage and the data processing circuitry further comprises second local temporary storage,
   wherein one of the first local temporary storage and the second local temporary storage is a translation lookaside buffer to store translation data to convert input virtual addresses to output physical addresses.

5. The data processing apparatus of claim 4, wherein the other of the first local temporary storage and the second local temporary storage is a data cache.

6. The data processing apparatus of claim 5, wherein the predetermined address range corresponds to a cache line size of the data cache.

7. The data processing apparatus of claim 6, wherein the data cache is a virtually indexed cache, and
   the data processing apparatus is arranged to perform the merged lookup in the data cache in parallel with a further merged lookup in the translation lookaside buffer.

8. The data processing apparatus of claim 6, wherein the data cache is a physically indexed cache, and
   the data processing apparatus is arranged to perform the merged lookup in the data cache using a physical address resulting from a prior merged lookup in the translation lookaside buffer.

9. The data processing apparatus of claim 5, wherein the predetermined address range corresponds to a smallest range of address space for which the translation lookaside buffer stores the translation data.

10. The data processing apparatus of claim 9, wherein the data cache is a virtually indexed cache, and
    the data processing apparatus is arranged to perform the merged lookup in the translation lookaside buffer in parallel with a pair of further lookups in the data cache.

11. The data processing apparatus of claim 9, wherein the data cache is a physically indexed cache, and
    wherein the data cache is arranged to use output of the merged lookup in the translation lookaside buffer to perform a pair of further lookups in the data cache.

12. The data processing apparatus of claim 10, wherein the data cache comprises a first port and a second port, and
    the data processing apparatus is arranged to cause the pair of further lookups to be performed in parallel via the first port and the second port.

13. The data processing apparatus of claim 10, wherein the data cache comprises buffer circuitry associated to buffer data lookup requests, and the data processing apparatus is arranged to cause the pair of further lookups to be performed as a first lookup followed by a second lookup, and to buffer the second lookup in the buffer circuitry whilst the first lookup is performed.

14. The data processing apparatus of claim 5, wherein in response to the merged lookup resulting in a miss in at least one of the data cache and the translation lookaside buffer the load circuitry is arranged to forward the merged lookup to a next level of memory hierarchy.

15. The data processing apparatus of claim 5, wherein in response to the merged lookup resulting in a miss in at least one of the data cache and the translation lookaside buffer the load circuitry is arranged to forward an address of an older of the first load operation and the second load operation to a next level of memory hierarchy.

16. The data processing apparatus of claim 1, wherein the data processing apparatus is an in-order data processing apparatus, and
the first load operation and the second load operation correspond to load operations from a same issue group.

17. The data processing apparatus of claim 1, wherein the data processing apparatus is an out-of-order data processing apparatus.

18. The data processing apparatus of claim 1, wherein the issue circuitry is further arranged to identify a third load operation based on the common operand, and the load circuitry further comprises a third address generation unit to generate a third address in response to the third load operation identified by the issue circuitry,
wherein the address comparison unit is arranged to compare a group of addresses comprising the first address, the second address and the third address,
and the load circuitry is arranged to cause the merged lookup to be performed based on at least two of the group of addresses when the address comparison unit determines that the at least two of the group of addresses differ by less than the predetermined address range characteristic of the temporary storage.

19. The data processing apparatus of claim 18, wherein the issue circuitry is further arranged to identify a fourth load operation based on the common operand,
the load circuitry further comprises a fourth address generation unit to generate a fourth address in response to the fourth load operation identified by the issue circuitry,
the group of addresses further comprises the fourth address,
the merged lookup is a first merged lookup,
the at least two of the group of addresses is a first subset of at least two of the group of addresses, and
the load circuitry is arranged to cause a second merged lookup to be performed based on a second subset of at least two of the group of addresses when the address comparison unit determines that the second subset of at least two of the group of addresses differ by less than the predetermined address range characteristic of the temporary storage.

20. The data processing apparatus of claim 1, wherein in response to a detection of an exception during a merged lookup the data processing apparatus is arranged to signal the exception on an oldest load operation associated with the merged lookup.

21. The data processing apparatus of claim 1, further comprising data multiplexing circuitry to:
extract a first data item corresponding to the first address from a first output cache line resulting from a cache access; and
extract a second data item corresponding to the second address from a second output cache line.

22. The data processing apparatus of claim 21, wherein in response to a detection of an exception during extraction of the first data item and the second data item the data processing apparatus is arranged to signal the exception on an oldest load operation affected by the exception.

23. A method of performing data processing comprising the steps of:
identifying in a sequence of operations held in an issue queue a first load operation and a second load operation based on the first load operation and the second load operation being dependent on a common operand and availability of the common operand in the set of registers;
generating a first address in response to the first load operation;
generating a second address in response to the second load operation identified in the sequence of operations in the issue queue;
in a load unit comparing the first address and the second address; and
causing a merged lookup to be performed in local temporary storage of the load unit based on the first address and the second address when the first address and the second address differ by less than a predetermined address range characteristic of the local temporary storage.

24. A data processing apparatus comprising:
means for identifying in a sequence of operations held in an issue queue a first load operation and a second load operation based on the first load operation and the second load operation being dependent on a common operand and availability of the common operand in the set of registers;
means for generating a first address in response to the first load operation;
means for generating a second address in response to the second load operation;
in a load unit, means for comparing the first address and the second address; and
means for causing a merged lookup to be performed in local temporary storage of the load unit based on the first address and the second address when the first address and the second address differ by less than a predetermined address range characteristic of the local temporary storage.

* * * * *